US006941280B1

(12) United States Patent
Gastineau et al.

(10) Patent No.: US 6,941,280 B1
(45) Date of Patent: Sep. 6, 2005

(54) DETERMINING INTRA-DAY NET ASSET VALUE OF AN ACTIVELY MANAGED EXCHANGE TRADED FUND

(75) Inventors: Gary L. Gastineau, Short Hills, NJ (US); Clifford Weber, Denville, NJ (US)

(73) Assignee: The American Stock Exchange, LLC, New York, NY (US)

( * ) Notice: Subject to any disclaimer, the term of this patent is extended or adjusted under 35 U.S.C. 154(b) by 0 days.

(21) Appl. No.: 09/536,663

(22) Filed: Mar. 27, 2000

(51) Int. Cl.[7] .............................................. G06F 17/16
(52) U.S. Cl. ............................ 705/36; 705/35; 705/37; 705/38; 705/39; 705/50; 705/51; 235/379; 235/380; 340/825.26
(58) Field of Search ............................. 705/35–39, 50, 705/51; 235/379, 380; 340/825.36

(56) References Cited

U.S. PATENT DOCUMENTS

| 5,214,579 | A | * | 5/1993 | Wolfberg et al. ............. 705/36 |
| 5,806,048 | A | | 9/1998 | Kirou et al. |
| 5,875,437 | A | * | 2/1999 | Atkins ......................... 705/40 |
| 5,937,159 | A | | 8/1999 | Meyers et al. |
| 6,047,270 | A | * | 4/2000 | Joao et al. ..................... 705/44 |
| 6,317,728 | B1 | * | 11/2001 | Kane ............................ 705/37 |
| 6,456,982 | B1 | | 9/2002 | Pilpovic |

OTHER PUBLICATIONS

Ameritrade Exchange–Traded Funds—ETF Center:Home—World Wide Web—Could Exchange Traded Funds be Right for You.*
Ameritrade Exchange—Traded Funds—ETF Center: Education—World Wide Web–Explore the Essentials of EFTS.*
"Science and Technology: Digital Rights and Wrongs" The Economist, pp. 75–76, Jul. 17, 1999.

"On Lines and Planes of Closest Fit to Systems of Points in Space", K. Pearson, *Philosophical Magazine and Journal of Science*, vol. 2, Sixth Series, Jul.–Dec. 1901, pp. 559–572.
"Market Models: A Guide to Financial Data Analysis", C. Alexander, Wileys, 2001, pp. 143–178.
M.A. Berry et al., "Sorting Out Risks Using Known APT Factors", Financial Analysts Journal 44 (1988), 29–42; K.C. Chan, N.F.
Chen et al., "An Exploratory Investigation of the Firm Size Effect", Journal of Financial Economics 14 (1985), 451–471.
B.A. Rosenberg, "Extra–Market Components of Covariance in Security Returns", Journal of Financial and Quantitative Analysis 9 (1974), 263–274.
S. Beckers et al., "The Relative Importance of Common Factors Across the European Equity Markets", Journal of Banking and Finance 16 (1992), 75–97.
J.K. Kale et al., "Industry Factors versus Other Factors in Risk Prediction", working paper, University of California, Berkeley (1991).
E.F. Fama et al., "Common Risk Factors in the Returns of Stocks and Bonds", Journal of Financial Economics 33 (1993), 3–56.

(Continued)

*Primary Examiner*—James P. Trammell
*Assistant Examiner*—Daniel L. Greene
(74) *Attorney, Agent, or Firm*—Howrey Simon Arnold & White, LLP

(57) ABSTRACT

A system for determining an intra-day net asset value proxy of an actively managed exchanged traded fund and the like includes a trusted computer system that has a physical hardware and operating system configuration in which domain configuration and trust relationships are established to determine access to information in the trusted system. The system also decrypts a file having adjusted portfolio information to provide security positions and calculates the intra-day net asset value proxy for the fund by applying prices received from a quote feed to security positions in the fund portfolio.

26 Claims, 4 Drawing Sheets

OTHER PUBLICATIONS

B. Lehman et al., "The Empirical Foundation of the Arbitrage Pricing Theory", Journal of Financial Economics 21 (1988), 213–254.

G. Connor et al., "A Test for the Number of Factors in an Approximate Factor Model", Journal of Finance 48 (1993), 1263–1292.

* cited by examiner

DETERMINING INTRA-DAY NET ASSET VALUE OF AN ACTIVELY MANAGED EXCHANGE TRADED FUND

BACKGROUND

This invention relates to determining an intra-day net asset value proxy for actively managed exchanged traded funds or basket products structured as a regulated investment company or the like.

Exchange traded funds or basket products, such as S&P 500 Depository Receipts (SPDRs), are vehicles for holding a basket of securities that can be traded on an exchange or securities market. More specifically, these instruments usually represent an undivided ownership interest in a portfolio of stocks or other securities held by a Trust. The portfolio of stocks is often intended to track the performance of an index like the S&P 500 Index, and therefore seeks to invest substantially all of its assets in the stocks comprising the S&P 500 index, in proportion to the relative weights of stocks in that index. SPDR shares are securities issued by the SPDR Trust and may be traded on a stock exchange or in over the counter transactions.

The intra-day pricing of such securities is determined by supply and demand. Typically, these SPDR fund shares may be created or redeemed at the end of each business day at a net asset value price in so called "creation units". In the case of the SPDRs the creation unit has 50,000 SPDR fund shares. SPDR creation units are created or redeemed at the end of day at net asset value through an in-kind transfer of securities corresponding to the S&P 500 index. While the official net asset value (NAV) of the SPDR Trust is only published at the close of every business day, the value of the underlying S&P 500 index is published continuously throughout each trading day. The per SPDR value of the index can be derived and distributed electronically to brokers, dealers, and investors throughout the world.

An intra-day value disseminated by the exchange is a real-time calculation designed to give an investor a per SPDR share price, which is very close to what the intra-day net asset value would be, were it calculated. At the end of trading, the intra-day approximate calculation and the official NAV should be very close.

Intra-day values of exchange traded trusts such as SPDRs or mutual funds such as the Select Sector SPDRs may be evaluated from the publicly available creation basket on a per share basis throughout the day as if the creation basket were the portfolio of the fund. The calculation is relatively straight forward, since the creation basket composition changes little from day to day unless the index changes. While the fund may contain proportionately a few more shares of one stock and a few less of another stock than would be arrived at by multiplying the creation basket by the number of creation baskets that constitute the fund or by using the index itself in the computation, the calculation will be very close to net asset value in either case.

SUMMARY

According to an aspect of the present invention, a method of determining an intra-day net asset value proxy for an exchange traded fund includes receiving in an encrypted format adjusted portfolio information and decrypting the file having the adjusted portfolio information to provide security positions. The method also includes calculating the intra-day net asset value proxy for the fund by applying prices received from a quote feed to these decrypted security positions in the fund portfolio.

According to a still further aspect of the present invention, a computer program product for determining an intra-day net asset value proxy for an exchange traded fund includes instructions for causing a computer to receive in an encrypted format adjusted portfolio information, decrypt the file having the adjusted portfolio information to provide security positions and calculate the intra-day net asset value for the fund by applying prices received from a quote feed to these decrypted security positions in the fund portfolio.

According to a still further aspect of the present invention, a system includes a trusted computer system. The trusted system including a physical hardware and operating system configuration in which domain configuration and trust relationships are established to determine access to information in the trusted system. The system also includes a computer readable media storing a computer program product for determining the intra-day net asset value proxy for an exchange traded fund. The program includes instructions for causing the trusted system to decrypt a file having adjusted portfolio information to provide security positions and calculate the intra-day net asset value for the fund by applying prices received from a quote feed to these decrypted security positions in the fund portfolio.

One or more of the following advantages may be provided by one or more aspects of the invention.

Intra-day per share value calculations based on indexes or on creation unit baskets are appropriate for index based mutual funds or other instruments with readily available portfolios that are essentially not managed. However, other types of exchange traded funds or trusts can be produced. One type of exchange traded mutual fund can be an enhanced index fund that is designed to track or outperform an index. With this type of fund there may be no equivalent creation unit basket nor any other information readily available to provide the functional equivalent of the intra-day net asset value. In addition, there can be actively managed funds or trusts where there is no published index even remotely related to the portfolio of the fund.

DETAILED DESCRIPTION

Figure 1:
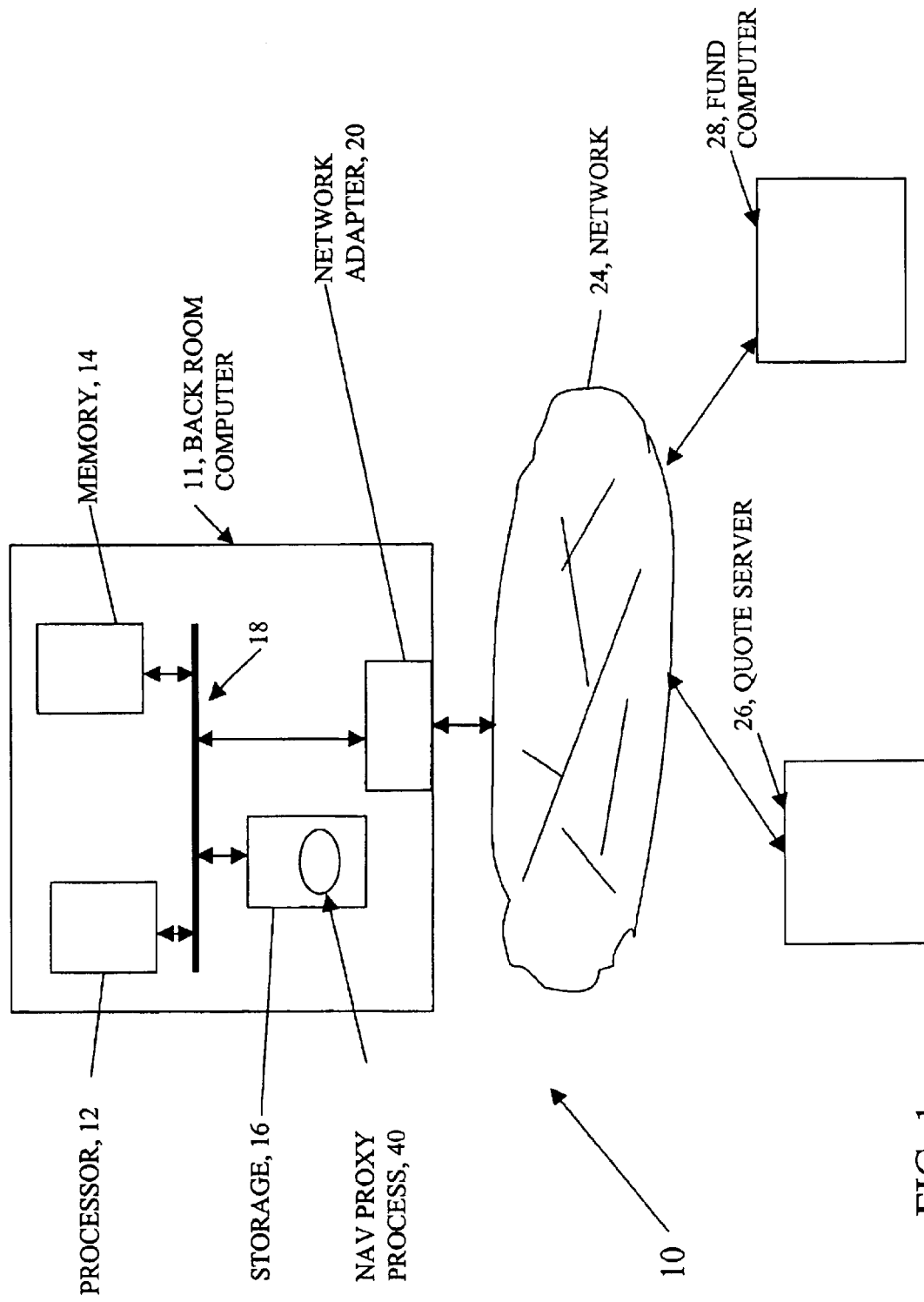
FIG. 1 is a block diagram of a computer system to perform an intra day net asset value proxy calculation.

Referring now to FIG. 1, back room operations of an exchange 10, an electronic market and so forth are shown. The operations 10 include a computer system 11, which includes a CPU 12, main memory 14 and persistent storage device 16 all coupled via a computer bus 18. The computer system 11 may be a server as shown, which is coupled in a network of computers in a conventional manner such as in a client-server arrangement. The details on the client server arrangement are not important to understand the present invention. The computer system 11 can also include output devices (not shown) such as a display and a printer, as well as input user interface devices (not shown) such as a keyboard and a mouse. The computer system 11 also includes a network interface 20, that couples the computer 11 to a network 24. The computer back room operation 10 also receives a quote feed from a quote server 26 and portfolio information from a computer 28 associated with an actively managed fund.

The computer system 10 receives information concerning real-time prices of securities from the quote server 26 and information concerning composition of portfolios from the fund computer 28. The computer system 11 also includes intra-day NAV proxy algorithm software 40 that calculates in real time an intra-day net asset value proxy for an exchange traded fund, in particular for actively managed funds or enhanced index funds. Examples of other products that can use an intra-day NAV calculation can include the value of a spot commodity pool or futures pool; a basket of fixed income instruments chosen for their yields, average maturities, specific durations, the currency in which they are denominated, or for other reasons or characterizations.

Figure 2:
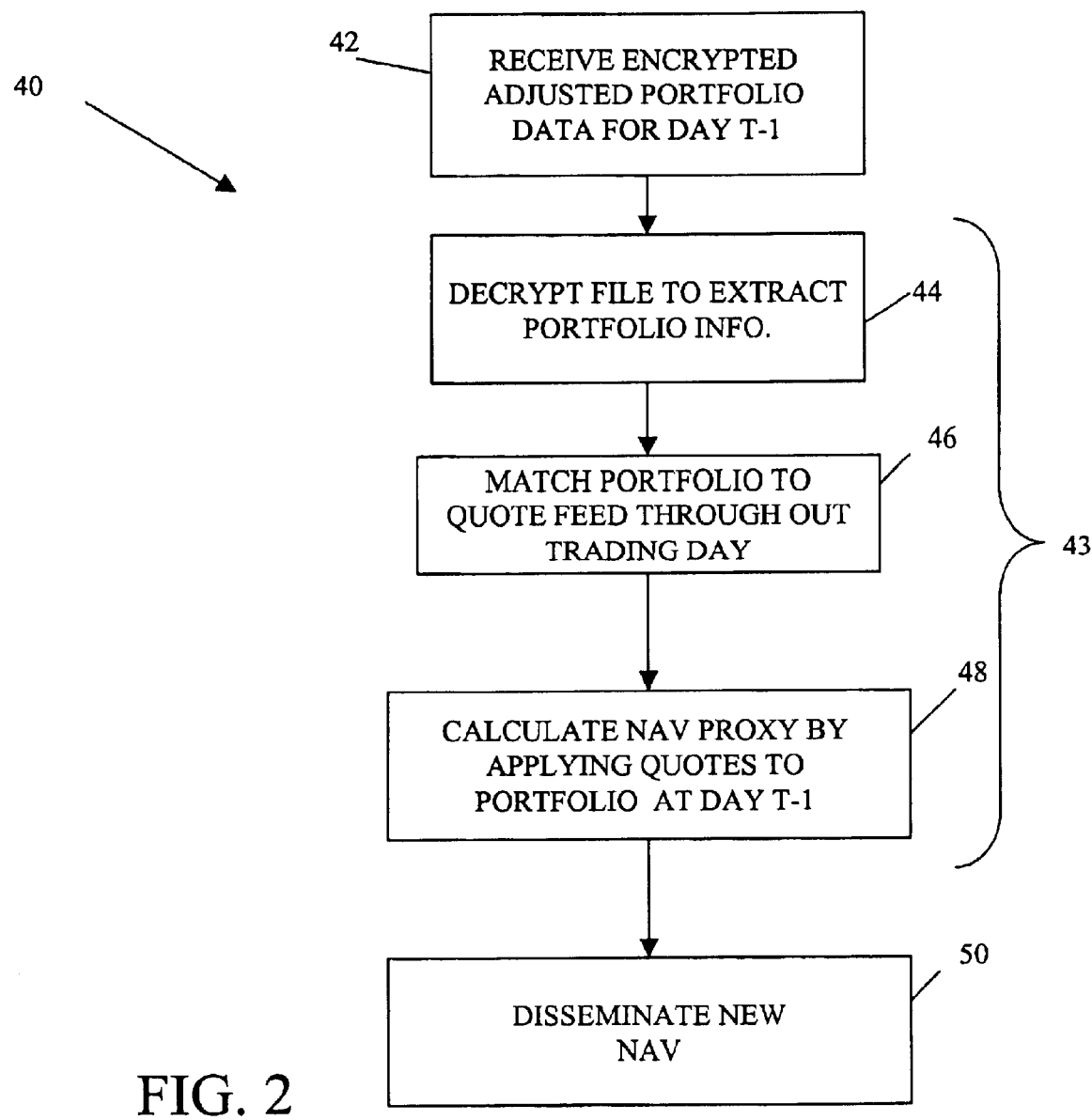
FIG. 2 is a flow chart showing a process to determine an intra-day net asset value proxy of an actively managed fund.

Referring now to FIG. 2, a process 40 to determine an intra-day net asset value proxy is shown. The process 40 can be used to calculate an intra-day NAV proxy for an actively managed portfolio or an enhanced index fund over the course of a trading day. The calculation can be performed in real time. The process 40 will be described in conjunction with an actively managed mutual fund. Once the closing portfolio is revised for the day's transactions, or more accurately, the next day's opening portfolio on which the intra-day NAV proxy and the official closing NAV will be calculated, has been determined and checked for accuracy by the portfolio management organization, the portfolio is encrypted and transmitted to the intra-day price calculation (42).

The net asset value process 40 receives 42 in an encrypted format from the portfolio management organization. This portfolio information has been adjusted to reflect any transactions made on the prior trading day (T−1). Official net asset value calculations that are disseminated to the general media after the close of trading on a current trading day (T) are based on the position of the fund at the close of the prior trading day (T−1). The net asset value is calculated on current day (T) as if no trades occurred during the trading day. In general, this convention makes little difference in the overall net asset value calculation of the fund because it is unusual to have a combination of massive turnover on a single day and a significant difference in price at which shares are sold on a current day and the closing price at which the fund is priced. The portfolio is also adjusted to take into consideration other factors such as dividend credits and expenses attributable to the current day (T). In other embodiments, the actual closing trade date positions of the fund on the current day can be used in the calculation.

The portfolio information is decrypted 44 and the information is used as the template for intra-day calculations. As a check, a closing price tape identical to the tape used in pricing the basket as of the previous night's close, can be fed to the template to determine if the net asset value calculated against the template is identical to the previous day's closing NAV plus or minus known adjustments. The decrypted portfolio can be re-encrypted using the same or a different encryption process and returned to the portfolio management organization where it will again be decrypted and compared with the file originally sent. This process is used to make sure that the file was not corrupted in the original encryption and transmission process. Other checks are possible including error correction, unauthorized use detection, checksums, etc.

The portfolio information file is encrypted using a public encryption key of a public-private key encryption algorithm with the corresponding private key being only known by the net asset value proxy calculation process 40. The received portfolio data is decrypted in the net asset value proxy calculation process 40 using the corresponding private key. A portion 41 of the process 40 is executed within a so called "trusted system". Trusted systems refer to a physical hardware and operating system configuration in which domain configuration and trust relationships are established to determine access to information on the computer 11.

A trusted computer can have the capability to recognize another trusted system, to execute usage rights (in this case access rights for the portfolio information file) and to render the file so that it cannot be copied or sent in decrypted form outside of the process 40. A highly secure channel can be established between the computer 11 and the fund computer 28 to enable a transaction where the two trusted systems exchange data over a communication channel, e.g., the Internet or a proprietary network feed, providing assurances to the fund computer 28 that it is in fact communicating with the exchange back room operation computer 11. Communications over a secure channel can be accomplished with encryption and what are known as challenge-response protocols. Other techniques are possible.

The computer system 11 would have a trusted relationship where a rights or privileges policy is established such that the decrypted portfolio file cannot leave the intra-day net asset value proxy process 40 in a decrypted form. That is, only the intra-day net asset value proxy process 40 itself is given privileges to access the data in the file and no copies can be made of the file. The file may reside in the system throughout trading until replaced with a new file for calculation of intra-day net asset value on the next trading day (T+1). At that time the file can be re-encrypted and returned to the actively managed fund or destroyed.

The process 40 matches 46 quotes from a quote feed to stocks in the portfolio throughout the current trading day (T). The process 40 calculates 48 a new net asset value proxy for the fund by applying real-time quotes received from the quote server 26 to positions in the fund portfolio. The process 40 can disseminate 50 a net asset value for the fund on a periodic or continual basis throughout the day.

Figure 3:
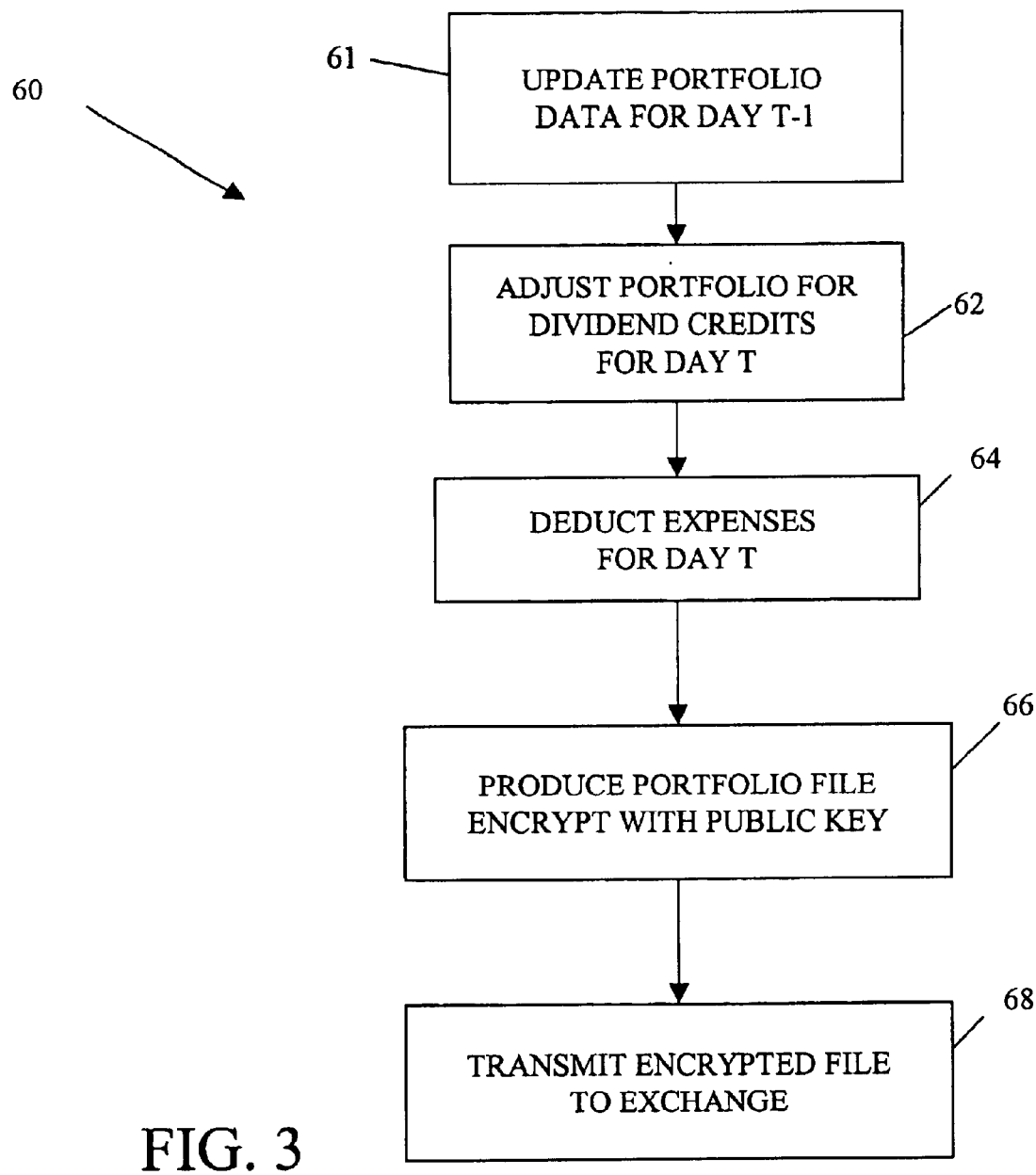
FIG. 3 is a flow chart showing a portfolio adjustment process.

Referring now to FIG. 3, a portfolio adjustment process 60 used to assemble a fund portfolio to send to the intra-day net asset value calculation process 40 is shown. Portfolio adjustment process 60 adjusts 61 portfolio positions to take into consideration any trading that occurred on the previous trading day (T−1). These positions in the portfolio are further adjusted 62 for dividend credits attributable to day (T), as well as adjusting 64 for any expenses attributable to day (T). Cash positions (not shown) are also taken into consideration. The adjusted portfolio is assembled into a portfolio file and includes additional information such as the total number of shares outstanding for the fund or basket, e.g., to quote vendors, and so forth. The portfolio file is encrypted 66 using the public key of the public-private key algorithm used in the process 40. The portfolio is transmitted 68 to the back room operations 10 of the exchange or market where it is received 42 (FIG. 2) and used as described in conjunction with FIG. 2.

Figure 4:
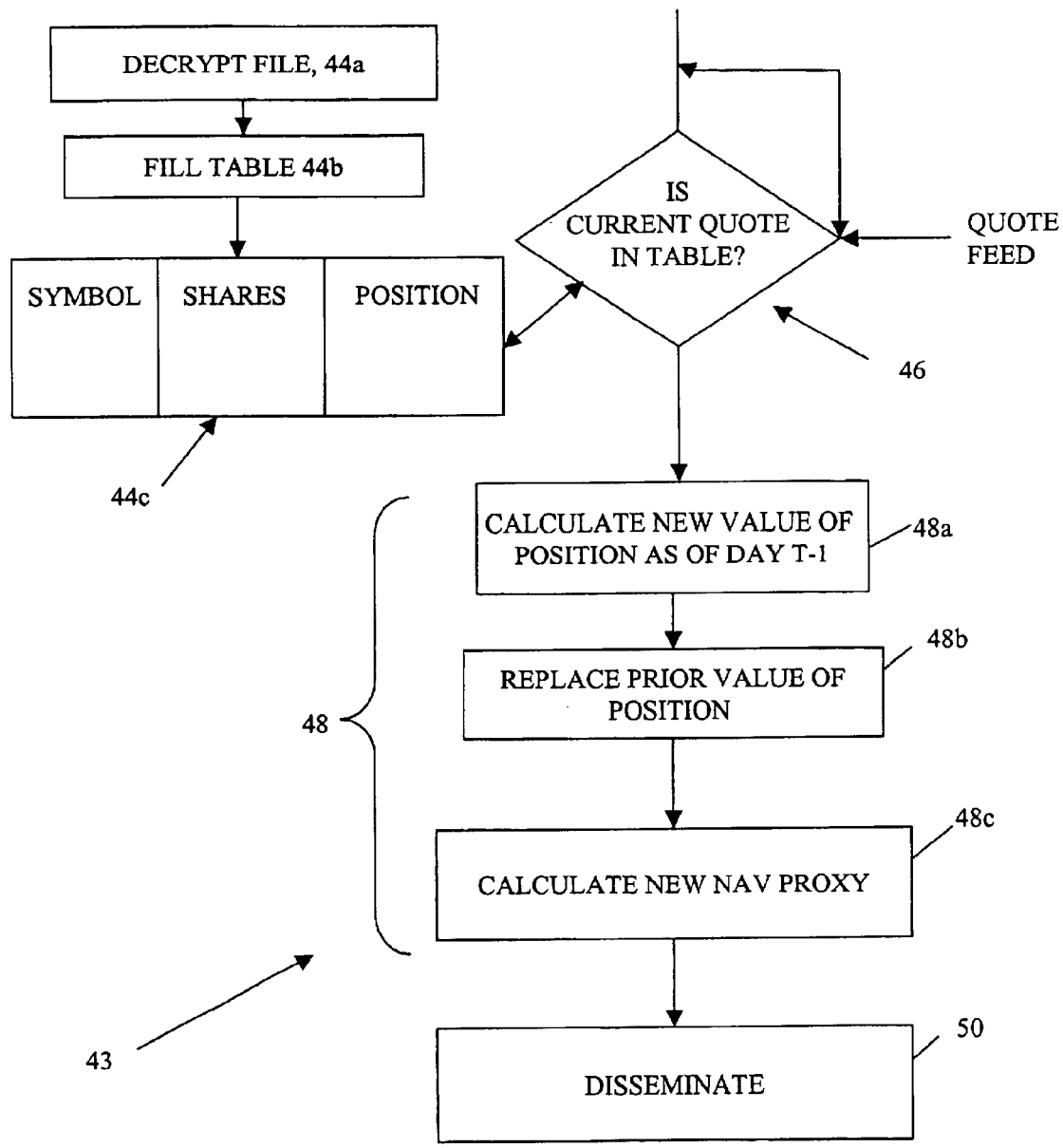
FIG. 4 is a flow chart showing an embodiment of an intra-day valuation process for an actively managed fund.

Referring now to FIG. 4, an embodiment of the intra-day valuation proxy process 40 for an actively managed fund is shown. The process 40 decrypts 44a the portfolio file, as received from the fund manager, and populates 44b a table 44c with fund positions. The table 44c can include, for example, security symbols, quantity of shares held and an indication of whether the position in the shares is a "short" position or a "long" position and so forth.

The process 43 continually receives 45 quotes or transaction prices from the trade and quote feeds and determines 46 whether a currently received security and price corresponds to a security in table 44c and thus is a security in the actively managed fund. If the security and price does not correspond to a security in the table, the process waits 47 to examine the next new security and price. Otherwise, the process 40 will calculate 48a a new value of the position (and its bid and offer if the price is a quote rather than a transaction price of the security) as of the trading day by, for example, retrieving the number of shares in the position and multiplying the number of shares by the current quote for the security. This new value will replace 48b, a prior value for the position in that security. The process 43 will calculate 48c, a new net asset value proxy and/or new bid or offer of underlying instruments, by taking the sum of the values of all current positions in the fund and dividing that by the total number of shares outstanding in the fund.

Another technique that can be used to calculate the net asset value proxy would have the portfolio table 44c include another field that has the value of the position on day (T−1). The table could also have a total of all positions. The net asset value proxy calculation would take the total valuation of the fund, subtract the old value of the position for a security and add the new value of the position for the security into the total. The new sum would be divided by the number of outstanding shares. The new, net asset value proxy calculation is disseminated 50 through the exchange to quote vendors.

With this intra-day net asset valuation proxy process 40, a stock exchange can calculate in real time, intra-day net asset value proxies for actively managed and enhanced exchange traded funds. Portfolio managers are assured that the positions of the fund are not known outside of the fund so that others, e.g., traders and competitors will not know what securities the fund is buying and selling. This is important to maintain a fiduciary duty to keep positions confidential where confidentiality is in the interest of the shareholders of the fund. Thus, this technique assures confidentiality while enabling the system 10 and, the backroom computer 11, to give investors up-to-date, i.e., real time information on valuations to facilitate trading in the mutual fund or trust instrument. Maintaining the confidentiality of this knowledge is important because public dissemination of the information may enable individuals and organizations in effect to trade against the fund. This confidentiality is assured by encrypting the file and only providing the software with the decryption key to decrypt the portfolio position information in the file.

The portfolio information is only available to the net asset value proxy calculation internal to the computer. The information is either re-encrypted or destroyed so that unauthorized access is prevented. This provides a process for determining an intra-day NAV proxy for actively managed or enhanced index funds that protects the information that the fund manager transmits to the intra-day NAV proxy calculation server.

A real time calculated net asset value proxy disseminated to the market may provide several advantages to the market. The real time calculated net asset value proxy can help establish tight valuation ranges (e.g., lower spreads between bid and ask) which may lead to tight pricing in markets for the basket of securities used to establish the funds. To the extent that trading in the basket would facilitate the formation of more units of the basket, i.e., creation of additional units of an exchange traded fund or additional units of a commodity basket, etc., the cost of maintaining and operating the basket or portfolio would be spread over a larger pool of assets. Consequently, the costs per-dollar of assets in the portfolio or basket might be reduced.

The backroom computer 11 on which the NAV calculation is performed should have appropriate testing procedures for evidence of tampering with software, hardware or data files or access by unauthorized persons to provide a high degree of both physical and data security during the period the decrypted portfolio file is in use in the calculation of intra-day Net Asset Value Proxies. The use of dual processors or systems, for redundancy i.e., fault tolerance, would also be appropriate. In addition to improving reliability, a fault tolerant system can facilitate management of the system if there is a problem in the calculation module. The ordinary steps that the management of a system installation could take to repair a hardware or software problem may be rendered more difficult by the encryption-decryption process and by the protections built into the processor. In other words, both the hardware and software may be less accessible than they would be in a normal installation.

Another aspect of the calculation is that it can provide in the context of an actively managed fund bid and offer values and a spread in terms of the fund intra-day NAV proxy. While the calculation generally is comparable in every material respect to the traditional 4:00 P.M. net asset value calculation, it may not be called a NAV calculation when distributed to the market because of the issue of liability for any data or calculation errors and because investors cannot necessarily buy or sell shares from the fund at that price. In addition, 4:00 P.M. closing prices are subject to verifications that may not be practical in an intra-day calculation.

Other Embodiments

It is to be understood that while the invention has been described in conjunction with the detailed description thereof, the foregoing description is intended to illustrate and not limit the scope of the invention, which is defined by the scope of the appended claims. Other modifications include sending files to a trusted third party, e.g., an accounting firm, for secured processing with or without encryption, sending unencrypted file(s) to an exchange controlled facility that is staffed with bonded employees or having the intra-day net asset value proxy process provided directly to the fund. Other aspects, advantages, and modifications are within the scope of the following claims.

What is claimed is:

1. A method using a computer readable medium for allowing the trading of shares of actively managed exchange traded funds comprising the steps of determining an intra-day net asset value proxy for the actively managed exchange traded fund by:

electronically receiving a file having adjusted portfolio security position information in the actively managed exchange traded fund in an encrypted format;

decrypting the file having the adjusted portfolio information to provide the security positions in the actively managed exchange traded fund portfolio;

checking the file having the adjusted portfolio information by:

electronically calculating a value of the portfolio based on the closing prices of the securities in the adjusted portfolio as of the previous trading day, and comparing the calculated value of the portfolio based on the closing prices of the securities in the portfolio as of the previous trading day and known adjustments with a published net asset value of the portfolio as of the close of the previous trading day; and electronically calculating the intra-day net asset value proxy for the actively managed exchange traded fund by applying prices received from a quote feed to the security positions in the actively managed exchange traded fund portfolio;

wherein the security positions of the actively managed exchange traded fund are kept confidential.

2. The method of claim 1 further comprising:

disseminating the intra-day net asset value proxy for the fund on a continual basis throughout a trading day.

3. The method of claim 1 wherein the portfolio information is adjusted to reflect any transactions made on the prior trading day.

4. The method of claim 1 wherein the portfolio information is adjusted to reflect credits and debits attributable to the current trading day.

5. The method of claim 1 wherein the net asset value proxy calculation is executed within a trusted system.

6. The method of claim 5 wherein the trusted system comprises physical hardware and an operating system configuration in which domain configuration and trust relationships are established to control access to information in the trusted system.

7. The method of claim 6 wherein the relationship established in the trusted system denies access to the decrypted portfolio file outside of the calculation process.

8. The method of claim 1 further comprising:

populating a table with security positions comprising a security identifier for each security position and quantity of the shares of each of the security positions held in the fund.

9. The method of claim 8 further comprising:

continually receiving quotes from a quote feed; and determining whether a currently received quote corresponds to a security in the table.

10. The method of claim 8 further comprising:

calculating a new value of a security position in the table as of the trading day by retrieving data comprising a number of shares in the position and multiplying the number of shares by the current quote for the security.

11. The method of claim 10 further comprising:

replacing a prior value for the position in that security in the table; and calculating a new fund net asset value proxy by taking the sum of the values of the current positions in all of the securities in the table and dividing that sum by the total number of shares outstanding in the fund.

12. The method of claim 1 further comprising:

disseminating the intra-day net asset value proxy for the fund on a periodic basis throughout a trading day.

13. A computer program product for determining an intra-day net asset value proxy for an actively managed exchange traded fund-comprising instructions for causing a computer to:

electronically receive a file having adjusted portfolio security position information in the actively managed exchange traded fund in an encrypted format;

decrypt the file having the adjusted portfolio information to provide a table having the actively managed exchange traded fund security positions;

check the file having the adjusted portfolio information by electronically calculating a value of the portfolio based on the closing prices of the securities in the portfolio as of the previous trading day; and electronically comparing the calculated value of the portfolio based on the closing prices of the securities in the portfolio as of the previous trading day with a published net asset value of the portfolio as of the close of the previous trading day;

electronically calculate the intra-day net asset value proxy for the actively managed exchange traded fund by applying prices received from a quote feed to the security positions in the table, wherein the security positions of the actively managed exchange traded fund are kept confidential.

14. The computer program product of claim 13 further comprising instructions for causing a computer to:

disseminate the intra-day net asset value proxy for the fund on a continual basis throughout a trading day.

15. The computer program product of claim 13 further comprising instructions to cause the computer to:

adjust the portfolio information to reflect any transactions made on the prior trading day.

16. The computer program product of claim 15 wherein the portfolio information is adjusted to reflect credits and debits attributable to the current trading day.

17. The computer program product of claim 13 further comprising instructions to:

populate the table with fund positions including a security identifier for each security position and quantity of shares of each security position held in the fund.

18. The computer program product of claim 17 further comprising instructions to:

receive quotes from a quote feed; and determine whether a currently received quote corresponds to a security position in the table.

19. The computer program product of claim 18 wherein for a security position in the table, instructions to calculate further comprise instructions to cause the computer to:

calculate a new value of the security position as of a current trading day by retrieving a number of shares in the position and multiplying the number of shares by the current quote for the security;

replace a prior value for the security position in the table; and calculate a new fund net asset value proxy by taking the sum of current values in all of the securities in the table and dividing that sum by the total number of shares in the table.

20. A system for determining an intra-day net asset value proxy for an actively manned exchange traded fund, comprising:

a trusted computer system comprising physical hardware and an operating system configuration in which domain configuration and trust relationships are established to control access to information in the trusted system; and a computer readable media storing a computer program product for determining the intraday net asset value proxy for the actively managed exchange traded fund, said program comprising instructions for causing the trusted system to:

decrypt a file having adjusted portfolio security position information in the actively managed exchange traded fund to provide the security positions in the actively managed exchange traded fund;

electronically check the file having the adjusted portfolio information by electronically calculating a value of the portfolio based on the closing prices of the securities in the portfolio as of the previous trading day; and electronically comparing the calculated value of the portfolio based on the closing prices of the securities in the portfolio as of the previous trading day with a published net asset value of the portfolio as of the close of the previous trading day;

electronically calculate the intra-day net asset value proxy for the actively managed exchange traded fund by applying prices received from a quote feed to security positions in the actively managed exchange traded fund portfolio, wherein the security positions of the actively managed exchange traded fund are kept confidential.

21. The system of claim 20 wherein the relationship established in the trusted system denies access to the decrypted portfolio file outside of the calculation process.

22. The system of claim 18 wherein the computer program product further comprises instructions for causing the trusted system to:

disseminate the intra-day net asset value proxy for the fund on a continual basis throughout the trading day.

23. A method of determining an intra-day net asset value proxy for an actively managed exchange traded fund comprising:

electronically receiving a file having adjusted portfolio security position information in the actively managed exchange traded fund in an encrypted format;

electronically decrypting the file having the adjusted portfolio information to provide the security positions in the actively managed exchange traded fund portfolio;

checking the file having the adjusted portfolio information by re-encrypting the adjusted portfolio information;

electronically sending the encrypted adjusted portfolio information to a portfolio management organization;

re-decrypting the re-encrypted adjusted portfolio information, and comparing the re-decrypted adjusted portfolio information with the adjusted portfolio security position information; and electronically calculating the intra-day net asset value proxy for the fund by applying prices received from a quote feed to the security positions in the actively managed exchange traded fund portfolio;

wherein the security positions of the actively managed exchange traded fund are kept confidential.

24. The method of claim 1, further comprising testing for evidence of tampering with software, hardware, or data files or access by unauthorized persons.

25. The computer program product of claim 13, further comprising instructions for causing a computer to test for evidence of tampering with software, hardware, or data files or access by unauthorized persons.

26. The system of claim 20, the program further comprising instructions for causing the trusted system to test for evidence of tampering with software, hardware, or data files or access by unauthorized persons.

* * * * *